United States Patent [19]

Hidaka

[11] Patent Number: 5,399,949
[45] Date of Patent: Mar. 21, 1995

[54] OVERLOAD PROJECTION APPARATUS FOR SMALL-SIZED TRIPOD HEAD

[75] Inventor: Masaru Hidaka, Omiya, Japan

[73] Assignee: Fuji Photo Optical Co., Ltd., Saitama, Japan

[21] Appl. No.: 82,945

[22] Filed: Jun. 29, 1993

[30] Foreign Application Priority Data

Jul. 2, 1992 [JP] Japan .................................. 4-199171

[51] Int. Cl.⁶ .............................................. H02P 5/00
[52] U.S. Cl. ........................................ 318/434; 361/23
[58] Field of Search ............... 318/434, 594, 466–470, 318/458, 461, 15, 630, 628; 361/23, 31, 33; 49/26, 118, 141; 166/291, 292

[56] References Cited

U.S. PATENT DOCUMENTS

| | | | |
|---|---|---|---|
| 3,766,461 | 10/1973 | Leenhouts | 318/630 |
| 4,312,033 | 1/1982 | Sweeney et al. | 318/594 |
| 4,338,553 | 7/1982 | Scott, Jr. | 318/466 X |
| 4,429,264 | 1/1984 | Richmond | 318/466 |
| 4,528,682 | 7/1985 | Nakaoki | 318/603 X |
| 4,682,091 | 7/1987 | Krewalk et al. | 318/696 X |
| 4,943,019 | 7/1990 | Mester | 318/466 X |
| 5,081,586 | 1/1992 | Berthel et al. | 318/466 X |
| 5,214,363 | 5/1993 | Wisner et al. | 361/23 X |

Primary Examiner—Jonathan Wysocki
Attorney, Agent, or Firm—Ronald R. Snider

[57] ABSTRACT

An overload protection apparatus for a small-sized tripod head which is capable of protecting the driving portion when overload is applied thereto without the need for a mechanical apparatus such as a slip mechanism and the like. Motors drive two driving shafts which are orthogonal to each other. Position sensors detect the rotating positions of the two driving shafts. When displacement of the driving shafts is not detected by the position sensors although a driving command signal is output by a microcomputer, it is judged that overload is applied to the motors and the motors are forcibly stopped. When the motors are forcibly stopped, the gears are reversed by a predetermined amount. When the gears are reversed, the backlash of the gear is corrected. Driving members are stored in the main chassis and a controller is stored in a storage portion which is formed by a sub-chassis outside of the main chassis.

5 Claims, 7 Drawing Sheets

PRIOR ART

FIG. 7

PRIOR ART

FIG. 8

OVERLOAD PROJECTION APPARATUS FOR SMALL-SIZED TRIPOD HEAD

BACKGROUND OF THE INVENTION

This application claims the priority of Japanese Patent Application No. 4-199171 filed on Jul. 2, 1992 which is incorporated herein by reference.

1. Field of the Invention

The present invention relates to an overload protection apparatus for a small-sized tripod head and, more particularly, to the structure of a measure for protecting the driving portion of a tripod head which directs a camera or the like to a desired direction by remote control, when overload is applied to the driving portion.

2. Description of the Related Art

In photographing by a television camera in broadcasting of ITV (Industrial Television), CCTV (Closed-Circuit Television) or the like, the television camera is often remote-controlled in order to take a good picture of a subject or to take a picture in a predetermined range. As a means for turning the television camera, a tripod head is used.

Figure 7:
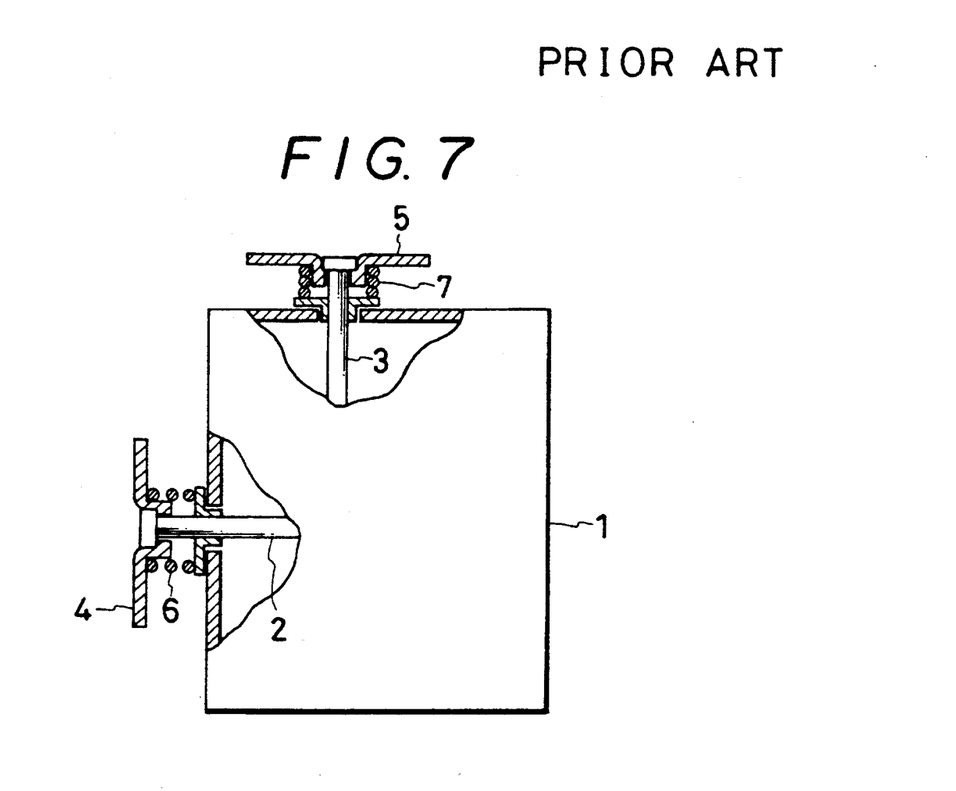
FIG. 7 is a partially sectional view of a driving shaft portion of a conventional tripod head.

FIG. 7 shows the structure of a conventional tripod head apparatus used by ITV. Two driving shafts 2 and 3 are provided to the tripod head apparatus in such a manner that they project from the side of a box body 1 produced by die casting or the like, and are orthogonal to each other at the right angle within the box body 1. Supporting disks 4 and 5 are attached to the projecting portions of these supporting shafts 2 and 3 through springs 6 and 7. A television camera is fitted to either of the supporting disks 4 or 5, and the other one is attached to a supporting wall (or a supporting stand) or the like. A motor driving portion (not shown) is connected to the other ends of the supporting disks 4 and 5, thereby rotating the driving shafts 2 and 3. For example, when the supporting disk 4 is attached to the supporting wall and a television camera is fitted to the supporting disk 5 by a special blacket so as to be in parallel with the front surface of the box body 1, the television camera is tilted (vertical direction) by the rotation of the supporting shaft 2, and panned (horizontal direction) by the rotation of the supporting shaft 3. In this way, it is possible to obtain a picture in a desired range by remote control.

Figure 8:
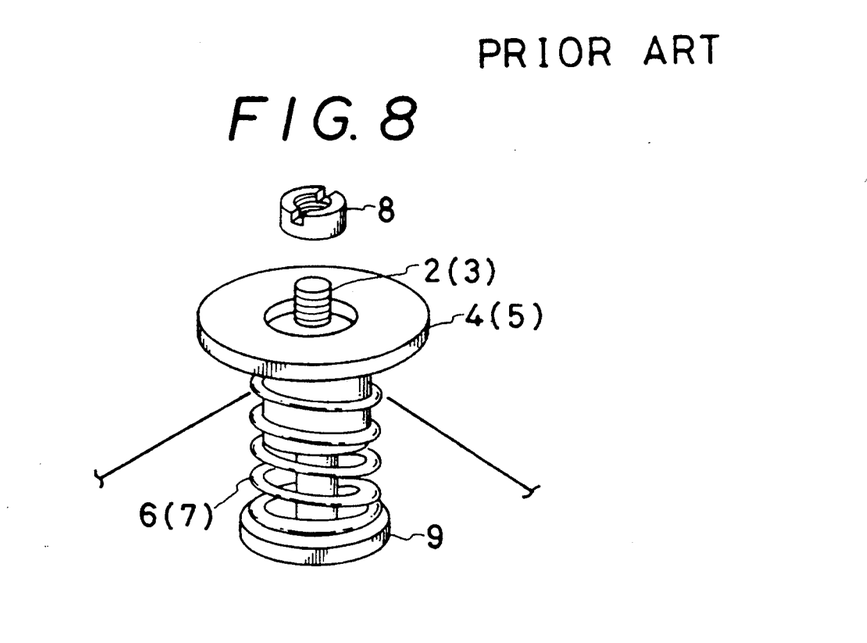
FIG. 8 is a perspective view of a slip mechanism of the conventional tripod head shown in FIG. 7.

In such a tripod head apparatus, a slip mechanism is used in order to protect the driving portion from overload. That is, as shown in FIG. 8, the supporting disk 4 (5) is connected to the driving shaft 2 (3) by using a fixing screw 8 in such a manner that the driving shaft 2 (3) can rotate within the box body 1, and the spring 6 (7) is fitted between a flange 9 and the supporting disk 4 (5) which are integrally attached to the driving shaft 2 (3). As a result, while the driving shaft 2 (3) and the supporting disk 4 (5) are connected to each other by the frictional force based on the urging force of the spring 6 (7), when overload is applied, the spring 6 (7) and the supporting disk 4 (5) slip, thereby reducing the load on the motor, the gears, or the like.

In the slip mechanism of the tripod head apparatus, however, since it is difficult to adjust and control the friction torque which is set by the springs 6 and 7, and the motor idles even when overload is applied thereto, electric power is wasted and the life of the motor is shortened.

The box body 1 of the tripod head apparatus is relatively large (the length and breadth are about 10 and several cm) and heavy. In response to the recent development of smaller-sized, lighter-weighted and simplified television cameras, the present applicant has proposed a smaller-sized tripod head apparatus. In this case, however, use of the slip mechanism is an obstacle to the reduction in the size and the weight of the tripod head apparatus.

SUMMARY OF THE INVENTION

Accordingly, it is an object of the present invention to eliminate the above-described problems in the related art and to provide an overload protection apparatus for a small-sized tripod head which is capable of protecting the driving portion without a mechanical means such as a slip mechanism when overload is applied thereto, and promoting the reduction in the size and the weight of a tripod head.

To achieve this aim, the present invention provides an overload protection apparatus for a small-sized tripod head comprising: a small-sized tripod head having a motor for driving two driving shafts which are orthogonal to each other, and a position detector for detecting the rotating positions of the driving shafts; and a microcomputor provided in the tripod head so as to judge whether or not overload is applied to the motor on the basis of an output of the position detector and a driving command signal and forcibly stop the motor when it is judged that overload is applied thereto. That is, when the displacement of the shafts is not detected by the position detector although a driving command signal is output, it is judged that overload is applied to the motor, and the motor is forcibly stopped by outputting a motor stopping command. It is therefore possible to protect the driving portion without the need for a mechanical protecting means such as a slip mechanism when overload is applied thereto, thereby saving electric power and promoting the reduction in the size and the weight of a tripod head apparatus.

When the motor is forcibly stopped, it is possible to reverse the gears by a predetermined amount, thereby releasing the gears which are nipped by the overload to protect the gears. When the rotations of the driving shafts are reversed, it is possible to correct the backlash of the gears before the motor drives. In this case, since the starting point of the rotation is always the same, the accurate control is enabled.

In addition, the box body of the tripod head according to the present invention may be composed of a tubular main chassis which forms a first storage portion as a closed space, and a sub-chassis attached to the projected pieces of the main chassis so as to form a second storage portion as a closed space between the sub-chassis and the main chassis. The two driving shafts and the motor are stored in the first storage portion of the main chassis, and the position detector and the microcomputor are stored in the second storage portion of the sub-chassis. In this way, the efficient arrangement of the driving members and the controller members is enabled and it is possible to prevent the controller from being impaired by the driving noise.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1:
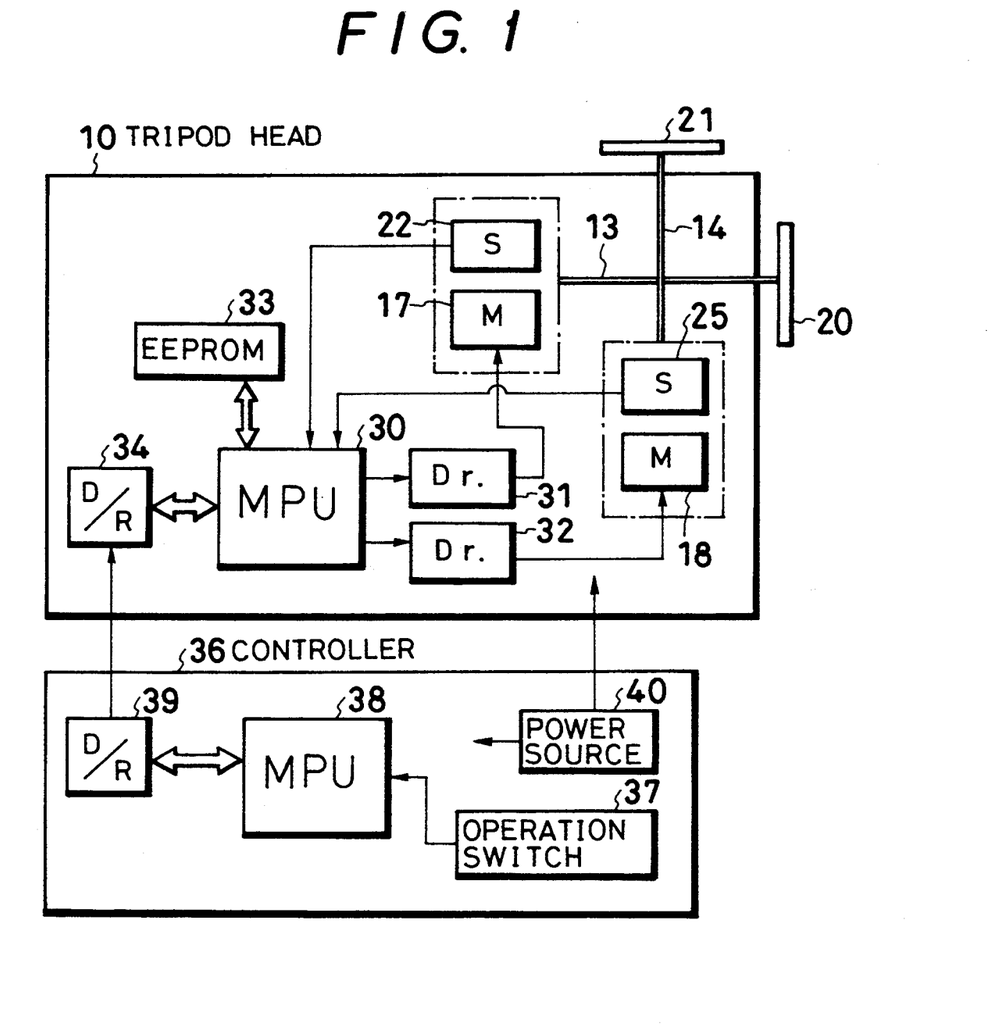
FIG. 1 is a block diagram of the circuit structure of an embodiment of an overload protection apparatus for a small-sized tripod head according to the present invention.
Figure 2:
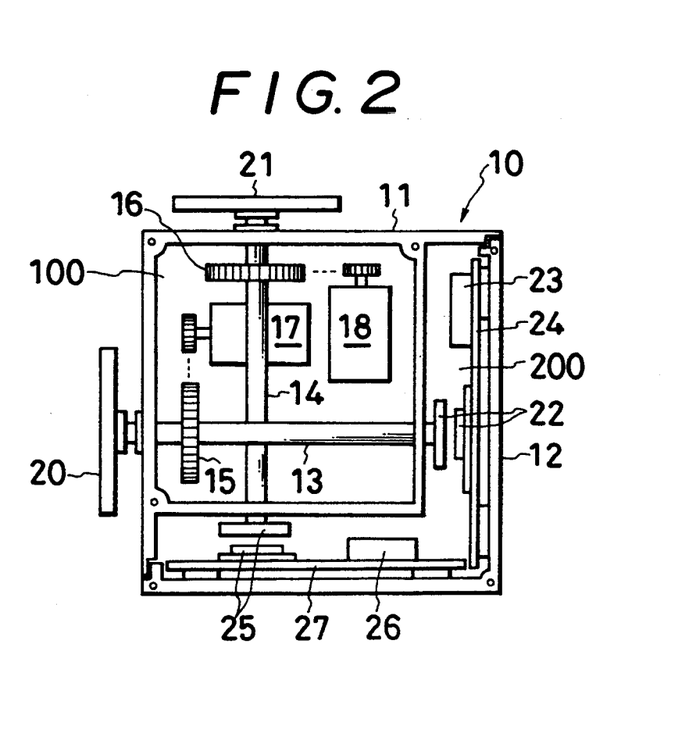
FIG. 2 shows the internal structure of the embodiment shown in FIG. 1.
Figure 3:
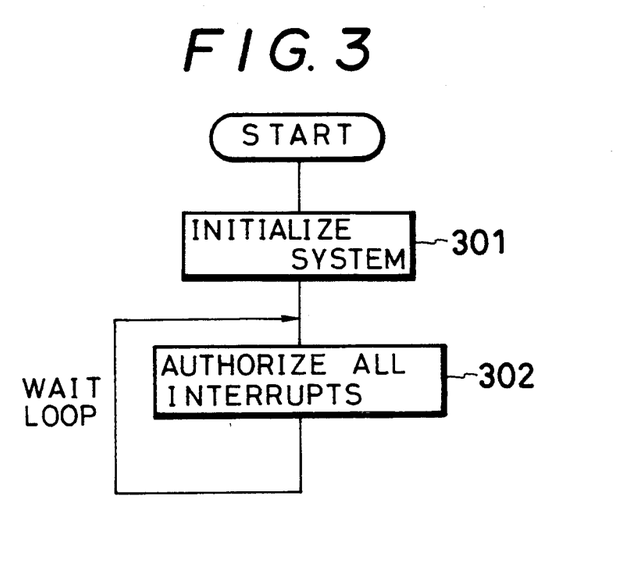
FIG. 3 is a flowchart of the main routine operated by a microcomputor in the embodiment.

FIG. 1 shows the circuit structure of an embodiment of an overload protection apparatus for a small-sized tripod head according to the present invention, and FIG. 2 shows the internal structure of the small-sized tripod head. Referring first to FIG. 2, a tripod head 10 is composed of a tubular main chassis 11 made of an aluminum extruded material and a sub-chassis 12 connected to the main chassis 11 as the side wall portion thereof, and each of the three dimensions of the tripod head is about 3 to 5 cm. A first storage portion 100 is formed within the main chassis 11, and a second storage portion 200 is formed by the projected pieces of the main chassis 11 and the sub-chassis 12. The first storage portion 100 is provided with driving shafts 13 and 14, gear trains 15 and 16, motors 17 and 18, and supporting disks 20 and 21 for connecting a television camera, a supporting wall and the like are fitted to the driving shafts 13 and 14. A controller circuit board 24 having a position sensor 25 composed of a rotary variable resistor and a controller 23, and a controller circuit board 27 having a position sensor 25 and a controller 26 are provided in the second storage portion 200, in correspondance with the driving shafts 13 and 14, respectively. According to the above-described structure, the efficient arrangement of the driving members and the controller members is enabled in the first storage portion 100 and in the second storage portion 200, thereby preventing the controller from being impaired by the driving noise.

In FIG. 1, the tripod head 10 is provided with a microcomputor (hereinunder referred to as "MPU") 30 for operating the drive control of the motors 17 and 18 and forcibly stopping the motors 17 and 18 when overload is applied. The MPU 30 is provided with a driver 31 for driving the motor 17 and a driver 32 for driving the motor 18, and the outputs of the position sensors 22 and 25 for detecting the rotating position of the driving shafts 13 and 14, respectively are supplied to the MPU 30. The MPU 30 is also provided with an EEPROM 33 which stores various information for controls, and a driver/receiver (D/R) 34 for transmitting and receiving a control signal.

A controller 36 is connected to the tripod head 10 via a cable, and the controller 36 is provided with a microcomputor (hereinunder referred to as "MPU") 38 for inputting an operation signal of an operation switch 37, a driver/receiver (D/R) 39 for transmitting and receiving a control signal to and from the tripod head 10, and an power source 40 for supplying electric power not only to the controller 36 but also to the tripod head 10. In this embodiment, control signals are serially transmitted between the controller 36 and the tripod head 10, and the controller 36 supplies to the tripod head a control signal based on the operation of the operation switch 37.

A direct control signal for driving the two driving shafts 13 and 14 is therefore formed by the MPU 30 in the tripod head 10. The forcible stop of the motors 17 and 18 is controlled by the MPU 30 on the basis of a driving command signal transmitted from the controller 36 and the outputs from the position sensors 22 and 25. The MPU 30 also controls the reversed rotation of the gear trains 15 and 16 by a predetermined amount when the motors 17 and 18 are forcibly stopped, and when the direction of drive is changed, that is, the rotations of the driving shafts 13 and 14 are reversed, the MPU 30 corrects the backlash of the gear trains 15 and 16.

FIGS. 3 to 6 show the control operations by the MPU 30 in the tripod head 10. According to the main routine in FIG. 3, a system is initialized at step 301, and a variable is cleared and a mode is set. At step 302, all interrupt routines are authorized at a wait loop. In this embodiment, for example, routines A and B which will be explained later are operated every predetermined time.

Figure 4:
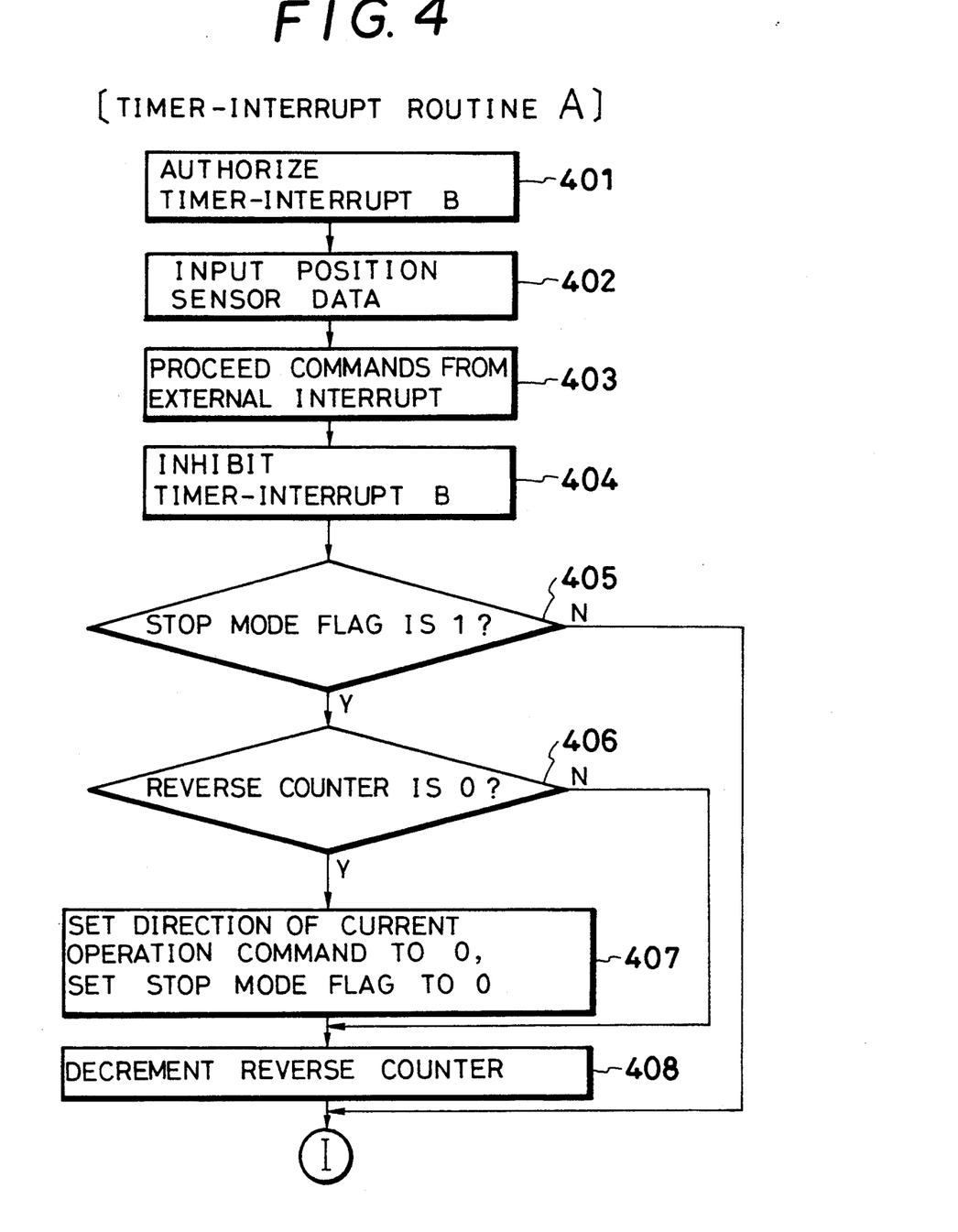
FIG. 4 is a flowchart of a timer-interrupt routine A operated by the microcomputor when the motor is driven in the embodiment.
Figure 5A:
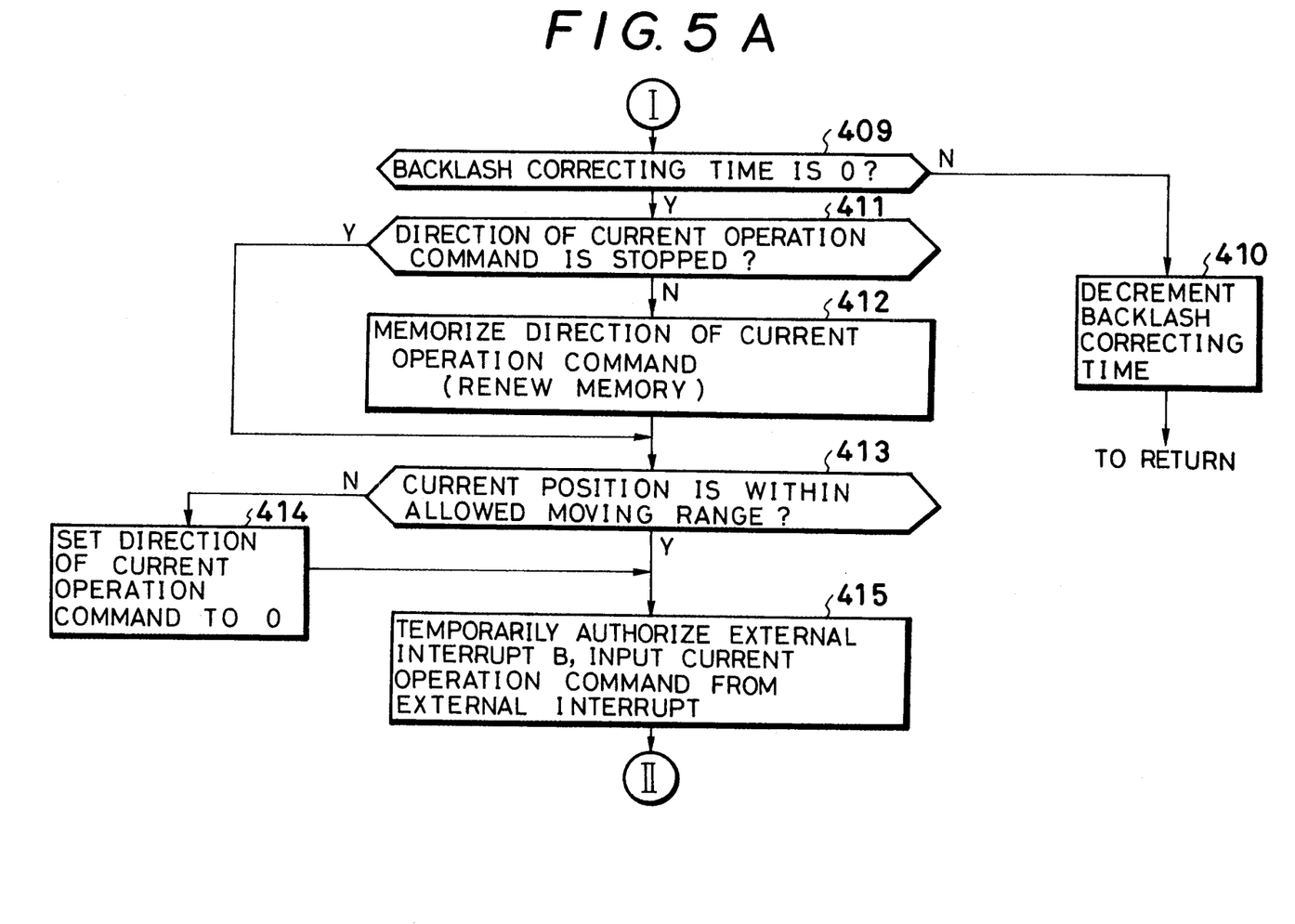
FIGS. 5A and 5B are flowcharts of the timer-interrupt routine A continued from FIG. 4.
Figure 5B:
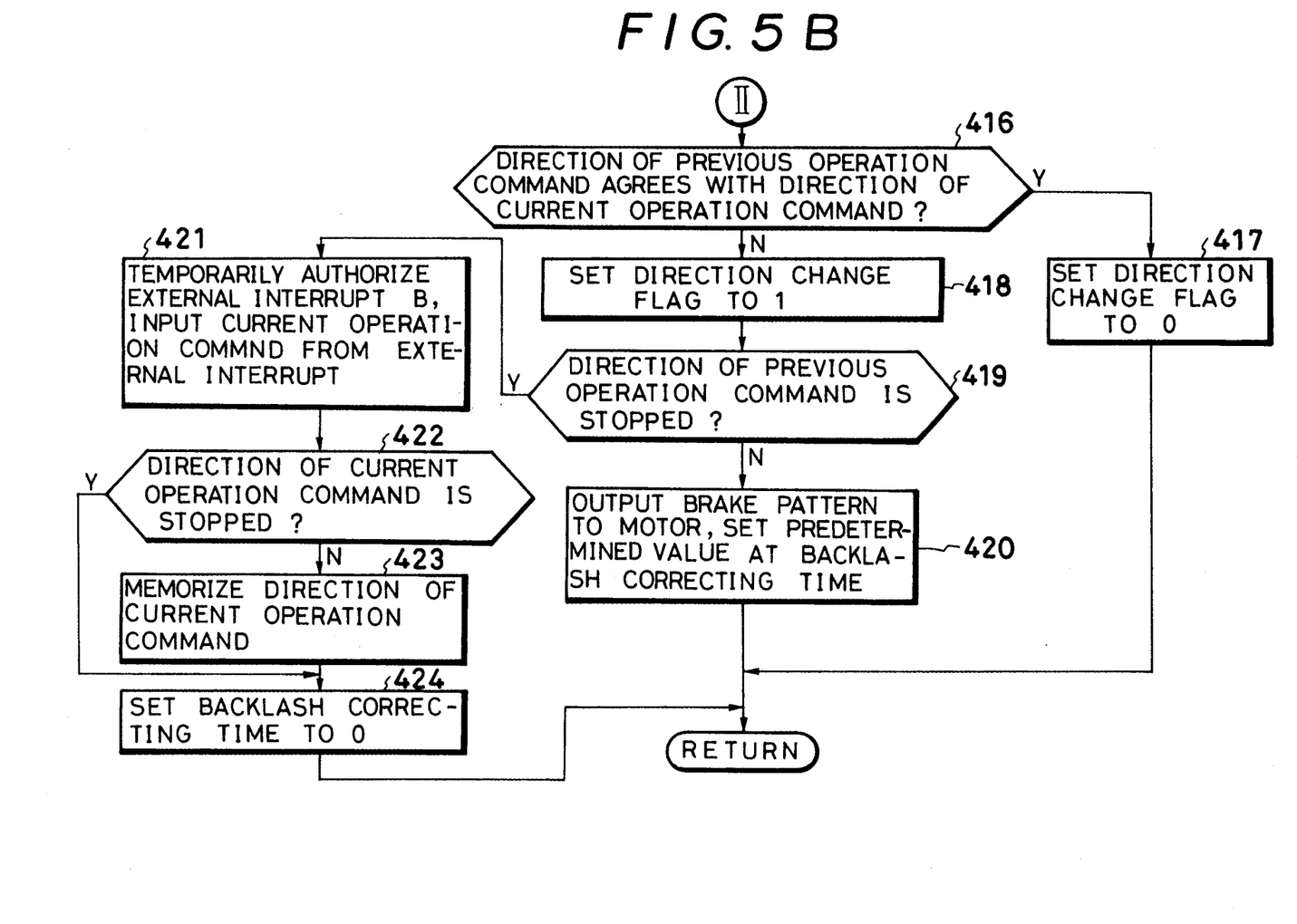
Figure 6:
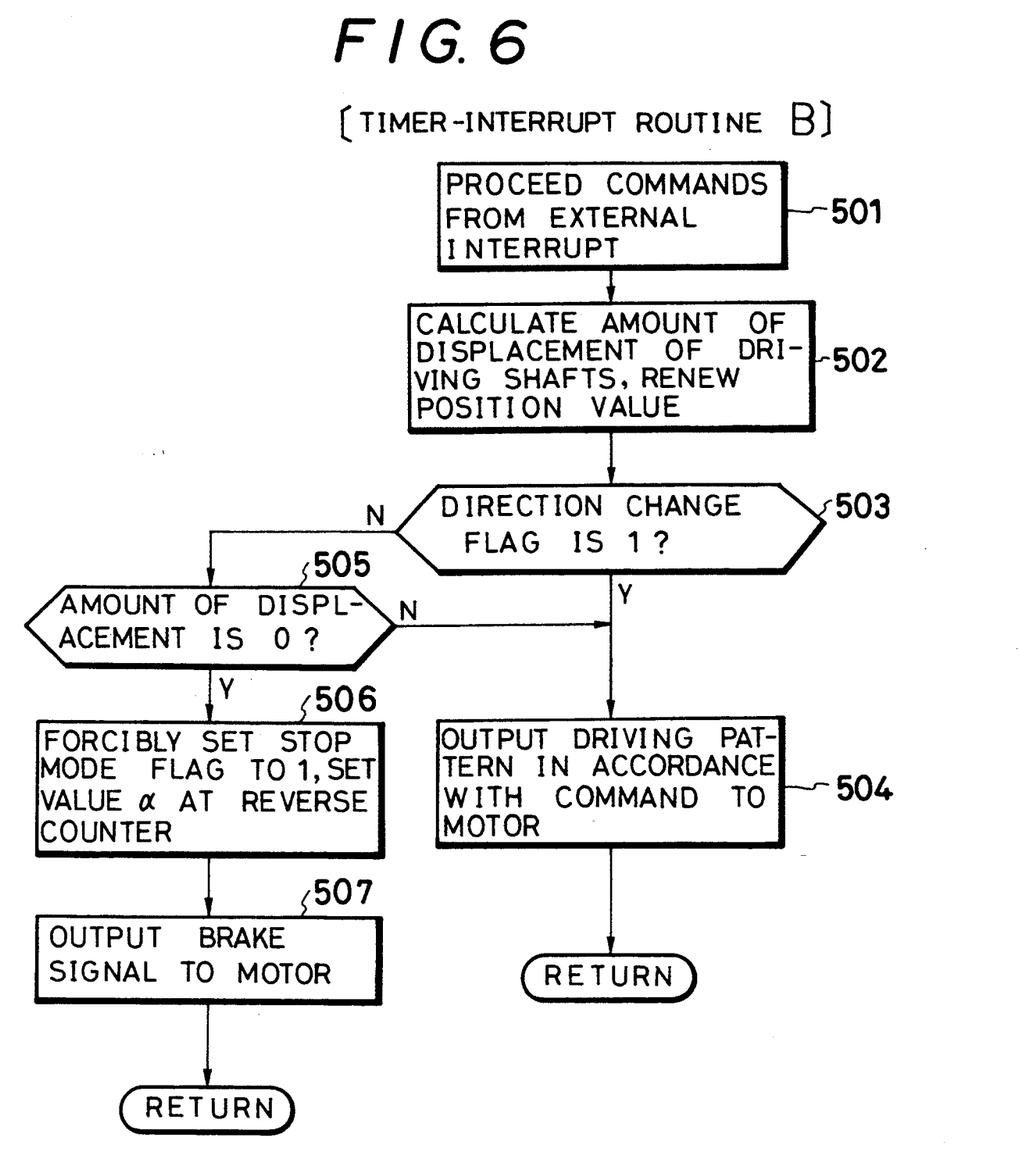
FIG. 6 is a flowchart of a timer-interrupt routine B of the embodiment operated by the microcomputor, so as to check the driving condition in the embodiment.

FIGS. 4, 5A and 5B show the timer-interrupt routine A operated when the motor is driven, and FIG. 6 shows the timer-interrupt routine B (check routine) for detecting the driving state. The timer-interrupt routine B is executed in the routine A. The routine B will now be explained. Since operation commands from the controller 36 of the tripod head 10 randomly and preferentially interrupt the operation of the MPU 30 of the tripod head 10 (referred to as "external interrupt" hereinunder), commands for the direction of drive, driving speed and the like from the external interrupt are processed at step 501. At step 502, the amount of displacement of the driving shafts 13 and 14 from the positions at the checking time is calculated. In this embodiment, the amount of displacement per unit time is calculated from the present detection value by subtracting the detection value at the previous checking time on the basis of the detection values (voltage, pulse or the like) of the position sensors 22 and 25 of the driving shafts 13 and 14. At the same time, the current value detected at the current checking time is newly memorized as a position value in place of the previous detection value.

At the next step 503, whether or not a command for a change (reverse) of the rotating directions (panning and tilting directions) of the driving shafts 13 and 14 is issued (whether or not a direction change flag is 1) is judged. If there is a commanded for dislocation [Y (YES)], the process proceeds to the next step 504, and the driving pattern in accordance with the command is output to the motors 17 and 18. In other words, if a direction change command is issued when the amount of displacement is checked, the motors 17 and 18 are not forcibly stopped whether the driving shafts 13 and 14 are displaced or not. On the other hand, if there is no direction change command [N (NO)] at step 503, judgement is made at step 505 as to whether or not the amount of displacement from the position detected at the previous checking time at step 502 is 0. If the answer is "N" there is no problem, so that the motors 17 and 18 are driven in accordance with the command (step 504).

If the answer is "Y" at step 505, since the amount of displacement is zero and overload is applied although a driving command is issued, the stop mode flag is forcibly set to 1 and a predetermined value α (amount of reversing) is set at a reverse counter at step 506. At step 507, the MPU 30 outputs a brake pattern of reversing, which forcibly stops and reverses the rotations of the motors 17 and 18 at the same time.

Referring to FIG. 4, the interruption of the timer-interrupt routine B is authorized at step 401, thereby checking the amount of displacement. Position sensor data is then input (step 402), commands for the direction of drive, the driving speed and the like from the external interrupt are processed (step 403), and at the next step 404, the interruption of the routine B is inhibited. At step 405, judgement is made as to whether or not a forcible or normal stop command is issued (whether or not the stop mode flag is 1). If the answer is "Y", whether or not the value of the reverse counter is 0 in the stop mode is judged at step 406. If it is judged that the value of the reverse counter is not 0 (N), the process proceeds to step 408, and the reverse counter is decremented. To state this more concretely, when a forcible stop command is issued at step 507, brake signals are supplied to the motors 17 and 18 so as to stop the motors 17 and 18. After the stopping operation is completed, the rotations of the motors 17 and 18 are reversed. At this time, the value of the reverse counter is set to α (step 506), and this value α is decremented at step 408. If it is judged that the reverse counter is 0 (Y) at step 406, the direction of the current operation command is stopped (set to 0) at step 407, and the stop mode flag is set to 0, thereby releasing the forcible or normal stop mode.

FIG. 5A shows the operation of the main routine A continued from FIG. 4. At step 409, judgement is made as to whether or not the backlash correcting time counter is 0. If the answer is "N", it indicates that the rotations of the driving shafts 13 and 14 are being reversed, so that the backlash correcting time is decremented at step 410. On the other hand, if the answer is "Y", whether or not the direction of the current operation command from the external interrupt is stopped is judged at step 411. If the answer is "Y", the process proceeds to step 413, while if the answer is "N", the direction of the current operation command is newly memorized in place of the direction of the previous operation command at step 412.

At step 413, whether or not the present position is within the allowed moving range is judged. If the answer is "N", the direction of the current operation command is stopped (set to 0) at step 414, thereby stopping the motors 17 and 18. On the other hand, if the answer is "Y", the interrupt routine B is temporarily authorized at step 415, and after the current operation command is input, the process proceeds to step 416 shown in FIG. 5B. At step 416, whether or not the direction of the previous operation command agrees with the direction of the current operation command is judged. If the answer is "Y", the direction change flag is set to 0 (step 417), and if the answer is "N", the direction change flag is set to 1 (step 418).

At the next step 419, judgement is made as to whether or not the direction of the previous operation command was a stop command. If the answer is "N", the rotations of the motors 17 and 18 are reversed. In this embodiment, a brake pattern is output and the backlash correcting time is set to a predetermined value at step 420. As a result, in the next execution of the routine, the driving shafts 13 and 14 are rotated extra by the amount of backlash of the gear trains 15 and 16 by the count decrement operation executed while the rotations of the driving shafts 13 and 14 are being reversed at step 410. In this way, the motors 17 and 18 are driven by the accurate amount of rotation.

At step 419, if the answer is "Y", since the motors are to be newly driven, the step interrupt routine B is temporarily authorized and a current operation command is input (step 421). When judgement is made as to whether or not the direction of the current operation command is a stop command (step 422), if the answer is "N", the direction of the current operation command is newly memorized in place of the direction of the previous operation command (step 423). After that, the backlash correcting time counter is set to 0 at step 424.

As described above, in this embodiment, when the motors 17 and 18 are forcibly stopped, the rotations of the motors 17 and 18 are reversed by a predetermined amount by setting the reverse counter to a predetermined value. It is therefore possible to protect the gear trains 15 and 16. When the rotations of the motors 17 and 18 are reversed, the driving shafts 13 and 14 are rotated extra by the amount of backlash of the gear trains 15 and 16 by setting a predetermined value at the backlash correcting time counter. It is therefore possible to solve the problem of an error in the amount of driving caused by the backlash and accurately control the driving shafts 13 and 14.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. An overload protection apparatus for a small-sized tripod head comprising:
    a small-sized tripod head having a motor for driving two driving shafts which are orthogonal to each other, and a position detector for detecting the rotating positions of the driving shafts;
    a microcomputer provided in the tripod head so as to judge whether or not overload is applied to said motor on the basis of an output of said position detector and a driving command signal and forcibly stop said motor when overload is applied thereto; and
    wherein a box body of said tripod head is composed of a tubular main chassis which forms a first storage portion as a closed space and a sub-chassis attached to the projected pieces of said main chassis so as to form a second storage portion as a closed space between said sub-chassis and said main chassis, and said two driving shafts and motor are stored in said first storage portion of the main chassis and said position detector and said microcomputer are stored in said second storage portion of said sub-chassis.

2. An overload protection apparatus for a small-sized tripod head according to claim 1, wherein when said motor is forcibly stopped, said gears are reversed by a predetermined amount.

3. An overload protection apparatus for a small-sized tripod head according to claim 1, wherein when the rotating directions of said driving shafts are reversed, the backlash of said gears are corrected before said motor is driven.

4. An overload protection apparatus for a small-sized tripod head according to claim 1, wherein said position detector detects the amount of rotation displacement of the driving members attached to the end portions of said two driving shafts which are projected from said main chassis toward said sub-chassis.

5. An overload protection apparatus for a small-sized tripod head comprising:

a motor for driving two driving shafts which are orthogonal to each other;

a position detector for detecting the rotating positions of said driving shafts; and a microcomputer for judging whether or not overload is applied to said motor and forcibly stopping said motor when displacement of said driving shafts is not detected by said position detector although a driving command signal is issued, reversing gears by a predetermined amount by setting a predetermined value at a reverse counter wherein the gears which are nipped by the overload are released to protect the gears when a forcible stop is executed, and driving said driving shafts an extra amount by the amount of backlash of said gears by setting a predetermined value at a backlash correcting time counter when the gear is reversed.

* * * * *